UNITED STATES PATENT OFFICE.

JONATHAN H. GREENE, OF PHILADELPHIA, PENNSYLVANIA, ASSIGNOR OF ONE-HALF TO FREDERICK A. LESTER, OF SAME PLACE.

PAINT.

SPECIFICATION forming part of Letters Patent No. 309,846, dated December 30, 1884.

Application filed December 14, 1883. (No specimens.)

*To all whom it may concern:*

Be it known that I, JONATHAN H. GREENE, a citizen of the United States, residing in the city and county of Philadelphia, State of Pennsylvania, have invented a new and useful Improvement in a Paint Compound, which improvement is fully set forth in the following specification.

In the Letters Patent of the United States, No. 276,029, granted to me, assignor, &c., on the 17th day of April, 1883, for a new and useful improvement in utilizing waste oil-cloth, &c., there is described a process of treating waste oil-cloth, &c., the result of which, in part, is a product of oil and pigment, each possibly of mixed colors and different kinds.

The object of the present invention is the conversion of said product or similar products into serviceable paint; and for this purpose I take one hundred pounds of the product and place it in a vessel or tank and add thereto one gallon of pure boiled linseed-oil, ten gallons of low-grade of benzine, ten gallons of pure kerosene or other mineral oil, ten pounds of caustic soda, and ten pounds of pulverized rosin or resin, to which latter is added one pint of No. 1 Japan drier. The proportions of the above may be varied according to requirements. The mass is then placed in a paint mill or mixer and thoroughly incorporated, and if it is not of sufficient body, or a particular color is required, I add sufficient dry paint of the desired color. The body may be thinned with kerosene or other mineral oil.

The resultant paint will be found to be superior in appearance, compactness, and durability.

Having thus described my invention, what I claim as new, and desire to secure by Letters Patent, is—

A paint compound formed of a mixture of oil and pigment recovered from waste oil-cloth with which are combined linseed-oil, benzine, kerosene, caustic soda, pulverized rosin, and Japan drier, in about the proportions stated.

JONATHAN H. GREENE.

Witnesses:
JOHN A. WIEDERSHEIM,
A. P. GRANT.